E. MOORE.
TIRE CHAIN.
APPLICATION FILED AUG. 2, 1919.

1,386,522. Patented Aug. 2, 1921.

WITNESS:
J.T.L. Wright

INVENTOR.
BY Edward Moore
Victor J. Evans
ATTORNEY.

UNITED STATES PATENT OFFICE.

EDWARD MOORE, OF PANA, ILLINOIS, ASSIGNOR OF ONE-HALF TO ETHELYN VAN SYCKLE GALVIN, OF PANA, ILLINOIS.

TIRE-CHAIN.

1,386,522.     Specification of Letters Patent.     Patented Aug. 2, 1921.

Application filed August 2, 1919. Serial No. 314,973.

*To all whom it may concern:*

Be it known that I, EDWARD MOORE, a citizen of the United States, residing at Pana, in the county of Christian and State of Illinois, have invented new and useful Improvements in Tire-Chains, of which the following is a specification.

This invention relates to improvements in non-skid chains and has for an object the provision of simple and efficient means for preventing a wheel from skidding, without injury to the tire.

Another object is the provision of a non-skid chain having a continuous smooth resilient surface adapted to be positioned centrally of the tire tread and carrying a plurality of spaced anti-skid plates, which are protected from contact with the tire to prevent injury to the latter, yet which will effectually grip the road to obtain proper traction and eliminate skidding.

Other objects and advantages of the intion will appear as the following description is read in connection with the accompanying drawings.

Figure 1:
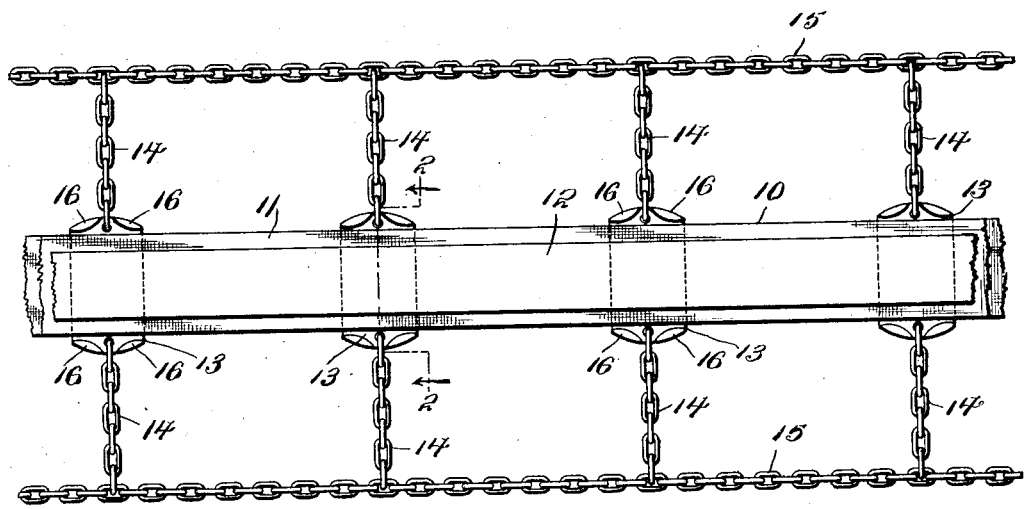
Figure 1 is a plan view of a portion of a non-skid chain embodying the present invention.
Figure 2:
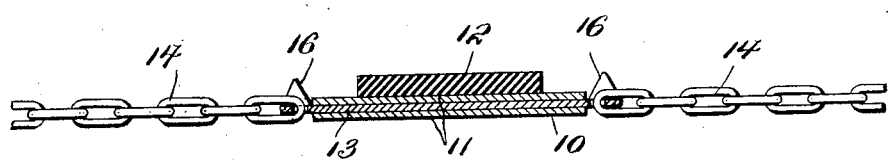
Fig. 2 is an enlarged sectional view on the line 2—2 of Fig. 1.
Figure 3:
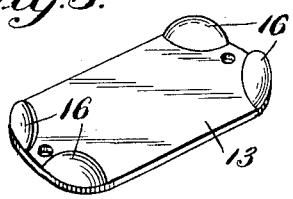
Fig. 3 is a detail perspective view of one of the anti-skid plates.

Referring to the drawings in detail, wherein like characters of reference denote corresponding parts, the invention is shown as comprising a tread member 10, which is formed of a suitable number of superimposed fabric strips 11 and a tread strip 12. The strip 12 is preferably formed of elastic material and together with the fabric strips 11, provides a continuous tread, which is adapted to be positioned centrally of the tread of a tire for the purpose of providing the said tire with an auxiliary smooth tread surface of relatively narrow width.

Secured transversely between the layers of fabric 11 and arranged in spaced relation are anti-skid plates 13, the said plates projecting beyond the outer edges of the fabric strips and being secured to one end of short chain sections 14. The opposite ends of these chain sections are connected by longitudinal chains 15, which when the invention is in position for use will be disposed circumferentially of the tire, as will be readily understood.

The outer ends of the plates 13 are provided with outwardly projecting studs 16, which are adapted to bite into the surface of the road to prevent skidding and to increase traction.

From the foregoing description and the accompanying drawings, it will be seen that the invention provides a non-skid chain, having a continuous smooth relatively narrow tread surface, constructed so as to prevent any uneven or sharp surface for contact with the tread portion of the tire. This adds materially to the life of the tire and reduces cost of operation of the vehicle.

The invention is susceptible of various changes in its form, proportions and minor details of construction and the right is herein reserved to make such changes as properly fall within the scope of the appended claim.

Having described the invention, what is claimed is:

A tire chain of the class described comprising a tread member formed of a plurality of fabric strips, a tread strip formed of elastic material, anti-skid plates arranged in spaced relation and secured transversely between the layers of fabric, said plate projecting beyond the outer edges of the fabric strips and being secured to the short chain sections, longitudinal chains connecting the opposite ends of said chain sections and disposed circumferentially of the tire, outwardly projecting studs provided on the outer ends of said plates.

In testimony whereof I affix my signature.

EDWARD MOORE.